US006205579B1

(12) United States Patent
Southgate (10) Patent No.: US 6,205,579 B1
(45) Date of Patent: *Mar. 20, 2001

(54) METHOD FOR PROVIDING REMOTE SOFTWARE TECHNICAL SUPPORT

(75) Inventor: Timothy J. Southgate, Redwood City, CA (US)

(73) Assignee: Altera Corporation, San Jose, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/958,414

(22) Filed: Oct. 27, 1997

Related U.S. Application Data (60) Provisional application No. 60/029,277, filed on Oct. 28, 1996.

(51) Int. Cl.[7] .................................................. G06F 9/445
(52) U.S. Cl. ................................ 717/11; 717/1; 707/203
(58) Field of Search .................................. 395/701, 702, 395/704, 712, 709; 380/25; 711/4; 709/229; 717/1, 11; 707/203, 205

(56) References Cited

U.S. PATENT DOCUMENTS

| | | | |
|---|---|---|---|
| 4,558,413 | * 12/1985 | Schmidt et al. | 707/203 |
| 4,768,087 | * 8/1988 | Taub et al. | 348/3 |
| 4,916,738 | * 4/1990 | Chandra et al. | 713/159 |
| 5,008,814 | * 4/1991 | Mathur | 709/221 |
| 5,111,413 | 5/1992 | Lazansky et al. | 364/578 |
| 5,155,836 | 10/1992 | Jordan et al. | 395/500 |
| 5,155,837 | * 10/1992 | Liu et al. | 709/221 |
| 5,206,939 | * 4/1993 | Yanai et al. | 711/4 |
| 5,220,512 | 6/1993 | Watkins et al. | 364/489 |
| 5,278,769 | 1/1994 | Bair et al. | 364/490 |

(List continued on next page.)

FOREIGN PATENT DOCUMENTS

| | | | |
|---|---|---|---|
| 0703531 A1 | 3/1996 | (EP) | G06F/9/44 |
| 0703531A1 | 3/1996 | (EP) | G06F/9/44 |
| 92/09160 A1 | 5/1992 | (WO) | H04L/9/00 |

(List continued on next page.)

OTHER PUBLICATIONS

Spang, III et al., "The BEACON block–diagram environment," World Congress of the International Federation of Automatic Control, vol. 2, Robust Control, Design and Software, Jul. 18, 1993, pp. 749–754.

Rimvall et al., "An Open Architecture for Automatic Code Generation Using the BEACON CACE Environment," Proceedings of IEEE/IFAC Joint Symposium on Computer–Aided Control System Design, Mar. 7, 1994, pp. 315–320.

Girardi et al., "A Register Transfer Level Schematic Editor and Simulator Interface," CSELT Technical Reports, vol. 13, No. 6, Nov. 1985, pp. 403–409.

(List continued on next page.)

*Primary Examiner*—Paul R. Lintz
*Assistant Examiner*—Anil Khatri
(74) *Attorney, Agent, or Firm*—Beyer Weaver & Thomas, LLP (57) ABSTRACT

A method for upgrading software is described. According to the invention, in response to operation of the software on a first platform, a connection is established between the first platform and a remote platform. Where first version data associated with the software are different from second version data from the remote platform, a portion of the software is overwritten with first updated code from the remote platform.

56 Claims, 7 Drawing Sheets

U.S. PATENT DOCUMENTS

| | | | |
|---|---|---|---|
| 5,301,318 | 4/1994 | Mittal | 395/600 |
| 5,335,320 | 8/1994 | Iwata et al. | 395/155 |
| 5,367,468 | 11/1994 | Fukusawa et al. | 364/490 |
| 5,422,833 | 6/1995 | Kelem et al. | 364/578 |
| 5,436,849 | 7/1995 | Drumm | 364/490 |
| 5,442,790 | 8/1995 | Nosenchuck | 395/700 |
| 5,463,563 | 10/1995 | Bair et al. | 364/490 |
| 5,499,192 | 3/1996 | Knapp et al. | 364/489 |
| 5,513,124 | 4/1996 | Trimberger et al. | 364/491 |
| 5,524,253 * | 6/1996 | Pham et al. | 709/202 |
| 5,541,849 | 7/1996 | Rostoker et al. | 364/489 |
| 5,572,436 | 11/1996 | Dangelo et al. | 364/489 |
| 5,572,437 | 11/1996 | Rostoker et al. | 364/489 |
| 5,574,655 | 11/1996 | Knapp et al. | 364/489 |
| 5,594,657 | 1/1997 | Cantone et al. | 364/490 |
| 5,623,418 | 4/1997 | Rostoker et al. | 364/489 |
| 5,625,565 | 4/1997 | Van Dyke | 364/489 |
| 5,661,660 | 8/1997 | Freidin | 364/489 |
| 5,673,198 | 9/1997 | Lawman et al. | 364/489 |
| 5,691,912 | 11/1997 | Duncan | 364/490 |
| 5,696,454 | 12/1997 | Trimberger | 326/38 |
| 5,715,387 * | 2/1998 | Barnstijn et al. | 714/38 |
| 5,721,912 | 2/1998 | Stepczyk et al. | 395/613 |
| 5,724,345 * | 3/1998 | Guarneri et al. | 370/316 |
| 5,737,234 | 4/1998 | Seidel et al. | 364/488 |
| 5,745,748 * | 4/1998 | Ahmad et al. | 707/10 |
| 5,761,079 | 6/1998 | Drumm | 364/489 |
| 5,801,958 | 9/1998 | Dangelo et al. | 364/489 |
| 5,809,145 * | 9/1998 | Slik et al. | 380/25 |
| 5,812,847 | 9/1998 | Joshi et al. | 395/682 |
| 5,848,263 | 12/1998 | Oshikiri | 395/500 |
| 5,850,348 | 12/1998 | Berman | 364/488 |
| 5,867,691 | 2/1999 | Shiraishi | 395/551 |
| 5,870,308 | 2/1999 | Dangelo et al. | 364/489 |
| 5,878,225 * | 3/1999 | Bilansky et al. | 709/227 |
| 5,896,521 | 4/1999 | Shackleford et al. | 395/500 |
| 5,901,066 | 5/1999 | Hong | 364/491 |
| 5,903,475 | 5/1999 | Gupte et al. | 364/578 |
| 5,909,545 * | 6/1999 | Frese, II et al. | 709/208 |
| 6,047,129 * | 4/2000 | Frye | 717/11 |
| 6,049,671 * | 4/2000 | Slivka et al. | 717/11 |
| 6,052,531 * | 4/2000 | Waldin, Jr. et al. | 717/11 |
| 6,067,582 * | 5/2000 | Smith et al. | 710/5 |
| 6,073,214 * | 6/2000 | Fawcett | 711/133 |
| 96/32679 | 10/1996 | (WO) | G06F/13/00 |
| 97/48044 | 12/1997 | (WO) | G06F/9/445 |

OTHER PUBLICATIONS

Heinkel and Glauert, "An Approach for a Dynamic Generation/Validation System for the Functional Simulation Considering Timing Constraints," Proceedings of the IEEE/Institute for Computer–Aided Circuit Design, Mar. 11, 1996, pp. 302–306.

Gupta et al, "Increasing software reliability through rollback and online fault repair", IEEE, pp 208–213, Apr. 1997.*

Hazeyama et al, "A problem report management system for software maintenance", IEEE, pp 1019–1024, 1999.*

Adam et al, "EDI through a distributed infromation systems approach", IEEE, pp 354–363, 1998.*

Rauscher et al, "Gray box risk assessment for telecommunications software modifications", IEEE, pp 208–213, Apr. 1996.*

Iftode et al, "Shared virtual memory with automatic update software", ICS ACM pp 175–183, 1999.*

Bershad et al, "Lightweight remote procedure call", ACM Trans. on computer sys. vol. 8, No. 1, pp 37–55, Feb. 1990.*

Gavish et al, "Dynamic file migration in distributed computer systems", ACM vol. 33, No. 2, pp 177–189, Feb. 1990.*

Keleher, "Tapeowrm high level abstartcions of shared accessess", USENIX Assoc OSDI pp 201–214, 1999.*

Riley et al., "An instance of the application download pattern: The SPAIDS software loader/verifier domain analysis and implementation", ACM 1997, pp 273–278, 1997.*

* cited by examiner

METHOD FOR PROVIDING REMOTE SOFTWARE TECHNICAL SUPPORT

RELATED APPLICATION DATA

The present application claims priority from U.S. Provisional application Ser. No. 60/029,277 entitled TOOLS FOR DESIGNING PROGRAMMABLE LOGIC DEVICES filed on Oct. 28, 1996, the entire specification of which is incorporated herein by reference.

This invention is related to U.S. patent application Ser. No. 08/958,002, filed on the same day as this patent application, naming B. Pedersen et al. as inventors, and entitled "GENERATION OF SUBNET LISTS FOR USE IN INCREMENTAL COMPILATION." That application is incorporated herein by reference in its entirety and for all purposes.

This invention is also related to U.S. patent application Ser. No. 08/958,436, filed on the same day as this patent application, naming J. Tse et al. as inventors, and entitled "FITTING FOR INCREMENTAL COMPILATION OF ELECTRONIC DESIGNS." That application is incorporated herein by reference in its entirety and for all purposes.

This invention is also related to U.S. patent application Ser. No. 08/958,670, filed on the same day as this patent application, naming D. Mendel as inventor, and entitled "PARALLEL PROCESSING FOR COMPUTER ASSISTED DESIGN OF ELECTRONIC DEVICES." That application is incorporated herein by reference in its entirety and for all purposes.

This invention is also related U.S. patent application Ser. No. 08/958,626, filed on the same day as this patent application, naming F. Heile et al. as inventors, and entitled "INTERFACE FOR COMPILING DESIGN VARIATIONS IN ELECTRONIC DESIGN ENVIRONMENTS." That application is incorporated herein by reference in its entirety and for all purposes.

This invention is also related to U.S. patent application Ser. No. 08/958,718, filed on the same day as this patent application, naming T. Southgate as inventor, and entitled "METHOD AND APPARATUS FOR AUTOMATED CIRCUIT DESIGN." That application is incorporated herein by reference in its entirety and for all purposes.

This invention is also related to U.S. patent application Ser. No. 08/958,434, filed on the same day as this patent application, naming T. Southgate et al. as inventors, and entitled "GRAPHIC EDITOR FOR BLOCK DIAGRAM LEVEL DESIGN OF CIRCUITS." That application is incorporated herein by reference in its entirety and for all purposes.

This invention is also related to U.S. patent application Ser. No. 08/958,432, filed on the same day as this patent application, naming T. Southgate et al. as inventors, and entitled "DESIGN FILE TEMPLATES FOR IMPLEMENTATION OF LOGIC DESIGNS." That application is incorporated herein by reference in its entirety and for all purposes.

This invention is also related to U.S. patent application Ser. No. 08/958,414, filed on the same day as this patent application, naming T. Southgate as inventor, and entitled "METHOD FOR PROVIDING REMOTE SOFTWARE TECHNICAL SUPPORT." That application is incorporated herein by reference in its entirety and for all purposes.

This invention is also related to U.S. patent application Ser. No. 08/958,777, filed on the same day as this patent application, naming T. Southgate as inventor, and entitled "METHOD FOR SIMULATING A CIRCUIT DESIGN" That application is incorporated herein by reference in its entirety and for all purposes.

This invention is also related to U.S. patent application Ser. No. 08/957,957, filed on the same day as this patent application, naming F. Heile et al. as inventors, and entitled "WORKGROUP COMPUTING FOR ELECTRONIC DESIGN AUTOMATION." That application is incorporated herein by reference in its entirety and for all purposes.

This invention is also related to U.S. patent application Ser. No. 08/958,798, filed on the same day as this patent application, naming F. Heile as inventor, and entitled "LOCAL COMPILATION IN CONTEXT WITHIN A DESIGN HIERARCHY." That application is incorporated herein by reference in its entirety and for all purposes.

This invention is also related to U.S. patent application Ser. No. 08/958,435, filed on the same day as this patent application, naming Alan L. Herrmann et al. as inventors, and entitled "EMBEDDED LOGIC ANALYZER FOR A PROGRAMMABLE LOGIC DEVICE." That application is incorporated herein by reference in its entirety and for all purposes.

This invention is also related to U.S. patent application Ser. No. 08/958,431, filed on the same day as this patent application, naming F. Heile as inventor, and entitled "ELECTRONIC DESIGN AUTOMATION TOOL FOR DISPLAY OF DESIGN PROFILE." That application is incorporated herein by reference in its entirety.

BACKGROUND OF THE INVENTION

The present invention relates to a method for providing software technical support from a remote location via, for example, the Internet. More specifically, the present invention provides a method by which software upgrades and fixes for software bugs may be incorporated into a customer's software from the remote location.

Once a software producing company has sold a software product to its customer, it is extremely important to keep track of these customers and to update the software periodically. No software program is ever bug free; in fact, the software industry is quite accustomed to re-releasing newer versions of software programs on a periodic basis in order to correct errors in the software. These later releases may add new features to the software, may correct minor problems, or often correct critical errors in the software. Because the performance of a software program is important for customers, it is in a software company's best interest to release these later versions of software to its customers and to insure that the newer software versions are received and installed correctly.

However, numerous obstacles are present that thwart even the best efforts of a conscientious software company to periodically update its software products with newer versions for all of its customers. One problem is that few customers who buy a software program go through the formalities of registering the program and sending the registration back to the software company. A registration form allows a software company to keep track of purchasers of its software, their addresses, contact persons, the version purchased, etc. However, few such software registration forms are received by software vendors. This makes it extremely difficult for a software company to determine to whom regular updates should be sent. For those software companies that update software regularly (such as quarterly) or may need to correct critical software bugs, this lack of software registration presents a real problem. And even if a registration form has been received, it is often difficult to figure out exactly to whom the new software version should be directed. Individuals change roles within an organization, organizations merge, engineers leave, etc., all making it extremely difficult to figure out to whom within an organization a new software version should be sent. It is also important that new versions of software be sent to a responsible person within the organization to ensure that all computers running the software are updated with the new version, and that the installation is done correctly. However, even with such competent individuals, errors in installation.

Another problem with releasing new versions of software to customers is the problem of distribution. In order to release a new version of the software, the vendor must purchase floppy or compact disks to hold the software, copy the software onto the disks, label the disks, determine who the appropriate customers and contacts are, and label and mail these disks to the correct individual. But as mentioned above, even if these disks containing the latest software version arrive at the correct location, there is no guarantee that the software will be installed correctly. Any problems encountered with the software, either due to bugs or incorrect installation will undoubtedly be blamed upon the software company that has sold the software program.

It is clearly in the best interests of a software company to ensure that updated versions of its software are timely received by the correct individuals within one of its customers, and correctly installed.

Another problem encountered by software companies is the identification and correction of software bugs encountered by customers in the course of using their software.

Typically, a customer receiving an error message while using software will call the software company and relate the circumstances surrounding the problem. Such a user may be able to relate generally what he was doing at the time, describe the problem that occurred, and report any error ID number that was produced. However, it is rare that specific details involving computer configuration, other programs running, and the status of internal variables are reported. Essentially, the problem is that the customer is in a location isolated from the software company when the problem occurs and has no means of transferring a "snapshot" of his system at the time the error occurs.

Of course, if the customer discontinues use of the software, ignores the problem, or otherwise chooses not to contact the software company with news of the error, the software company is put at a disadvantage. In these situations, because the vendor does not hear about the occurrence of the problem, it is not given the opportunity to correct it. Because errors in software can be extremely complex and subtle, it is very important for a software company to know exactly the circumstances under which the problem occurred in order to be able to reproduce the problem and to solve it. For customers using the software at a remote location on a remote computer, it is unlikely and extremely difficult that a customer will be able to transfer all of the information concerning such a problem back to the software company.

It is therefore desirable that a technique be provided by which a software vendor can track customers, upgrade customer software with newer versions, and correct software bugs from remote locations.

SUMMARY OF THE INVENTION

According to the present invention, techniques are provided by which a software vendor may provide software technical support to its customers from a remote location via the Internet. When the end user begins operating the vendor's software, dialog boxes give the user the opportunity to register the software with the vendor. If the user decides to register the software, a connection between the user's platform and the vendor is established via the Internet to effect registration. Moreover, each time thereafter that the user begins operating the software, an Internet connection to the vendor is established for the purpose of determining whether a software upgrade is necessary. Version data for each of the software's modules as well as any critical bug data known by the vendor are downloaded to the user's platform for comparison to the user's current version of the software. Where the downloaded version data agree with the user's module versions, and where there are no known bugs, the user's software remains unchanged. However, if the comparison reveals that one or more of the user's software modules are outdated or infected with a critical bug, dialog boxes are presented to the user for each such module requesting whether an upgrade is desired. A list is maintained of the modules for which an upgrade is requested. When all of the modules have been checked in this manner, the latest version of the modules in the upgrade list are downloaded from the vendor and written over the corresponding outdated modules on the user's platform.

According to another embodiment of the invention, a method is provided by which a vendor may effectively troubleshoot errors in the operation of its software from a remote location via the Internet. When a user encounters an error in the operation of the vendor's software, operation of the software is suspended and an Internet connection to the vendor is established by which the error is reported and known critical bug data are downloaded to the user's platform. The critical bug data are compared to the state of the user's software to determine whether the error corresponds to any known bugs previously documented by the vendor. Where the error corresponds to a known bug, the user is given the option, e.g., via a dialog box, to download a software fix from the vendor. This may be, for example, a replacement module to overwrite the module with the bug. Where, however, the error does not correspond to any known bug, software on the vendor's platform determines what information must be uploaded from the user's platform, subject to the user's authorization, in order to recreate on the vendor's platform the conditions under which the error occurred; this for the purpose of troubleshooting the error locally, i.e., on the vendor's platform. If the user does not authorize the upload, the vendor supplies information to the user regarding the nature of the error (to the extent possible) and an appropriate contact person with whom the user may attempt to solve the problem.

Thus, the present invention provides a method for upgrading first software. According to the invention, in response to operation of the first software on a first platform, a connection is established between the first platform and a remote platform. Where first version data associated with the first software are different from second version data from the remote platform, a portion of the first software is overwritten with first updated code from the remote platform.

The present invention also provides a method for troubleshooting first software. According to the invention, in response to an error in operation of the first software on a first platform, a connection is established between the first platform and a remote platform. Where the error corresponds to known error data from the remote platform, a portion of the first software is overwritten with updated code.

A further understanding of the nature and advantages of the present invention may be realized by reference to the remaining portions of the specification and the drawings.

DESCRIPTION OF SPECIFIC EMBODIMENTS

Figure 1:
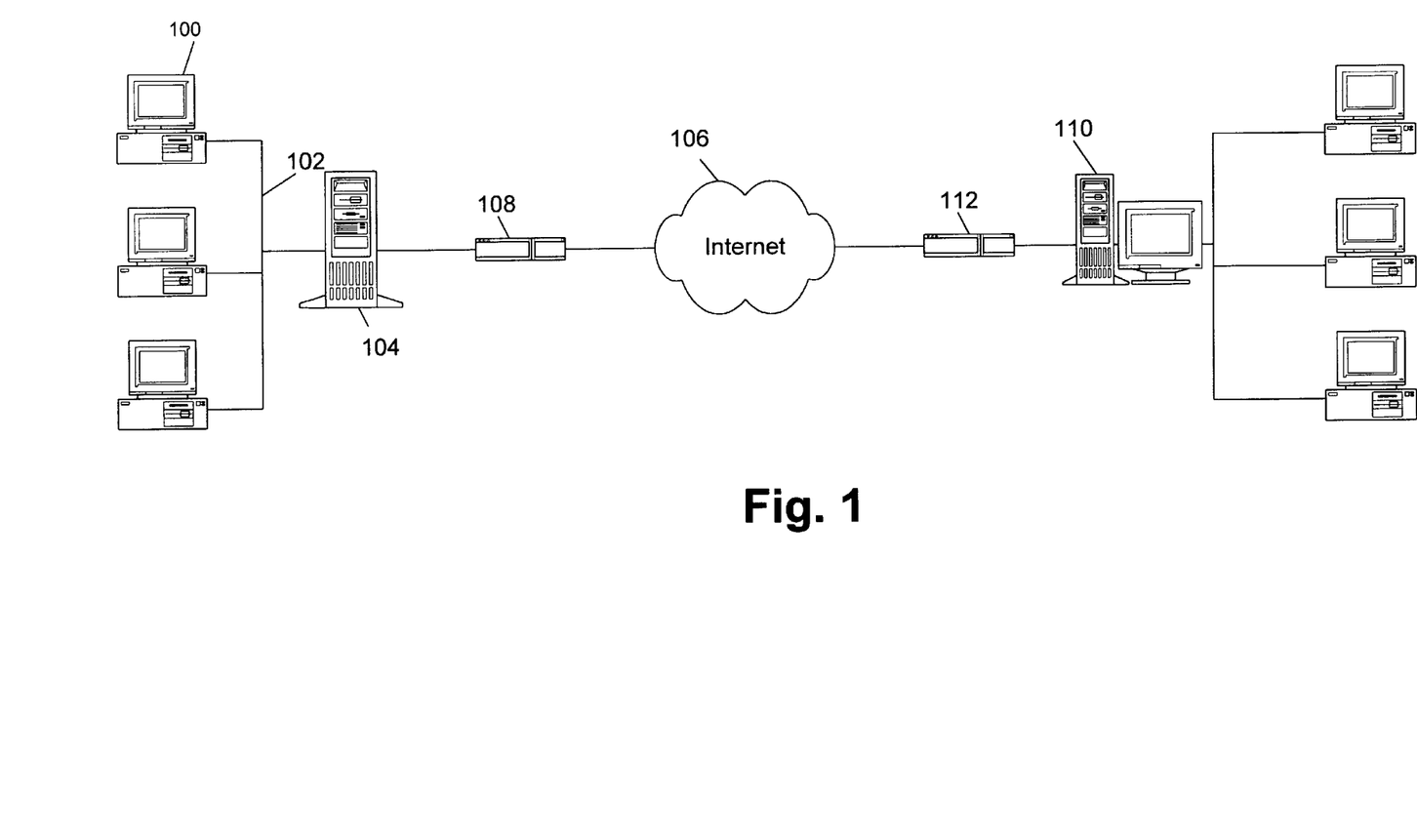
FIG. 1 is a diagram of a network environment in which specific embodiments of the present invention may be implemented.

FIG. 1 is a simplified representation of a network environment in which specific embodiments of the present invention may be implemented. Customer platform 100 is a workstation or personal computer (PC) on which software from a particular vendor is installed. An example of the type of software installed on customer platform 100 which may be employed with the present invention is described in commonly assigned, copending U.S. patent application Ser. No. 08/958,778 for METHOD AND APPARATUS FOR AUTOMATED CIRCUIT DESIGN, filed simultaneously herewith, the entire specification of which is incorporated herein by reference. Software used to design circuits such as, for example, programmable logic devices, is extremely complex and, as such, is the type of software which could especially benefit from the features of the present invention. That is, such software typically requires its vendor to maintain a large technical support capability to ensure customer satisfaction. It will be understood, however, that the techniques described herein may be applied to a wide variety of software without departing from the scope of the invention.

Customer platform 100 resides on a local area network (LAN) 102 with a file server 104 which is, in turn, connected to the Internet 106 via a router 108. Vendor platform 110 is a file server which is remote from LAN 102 and is connected to Internet 106 via router 112. It will be understood that the network environment illustrated in FIG. 1 is one example of an environment in which the present invention may be practiced, and that a wide variety of network configurations may be employed without departing from the scope of the invention.

Figure 2:
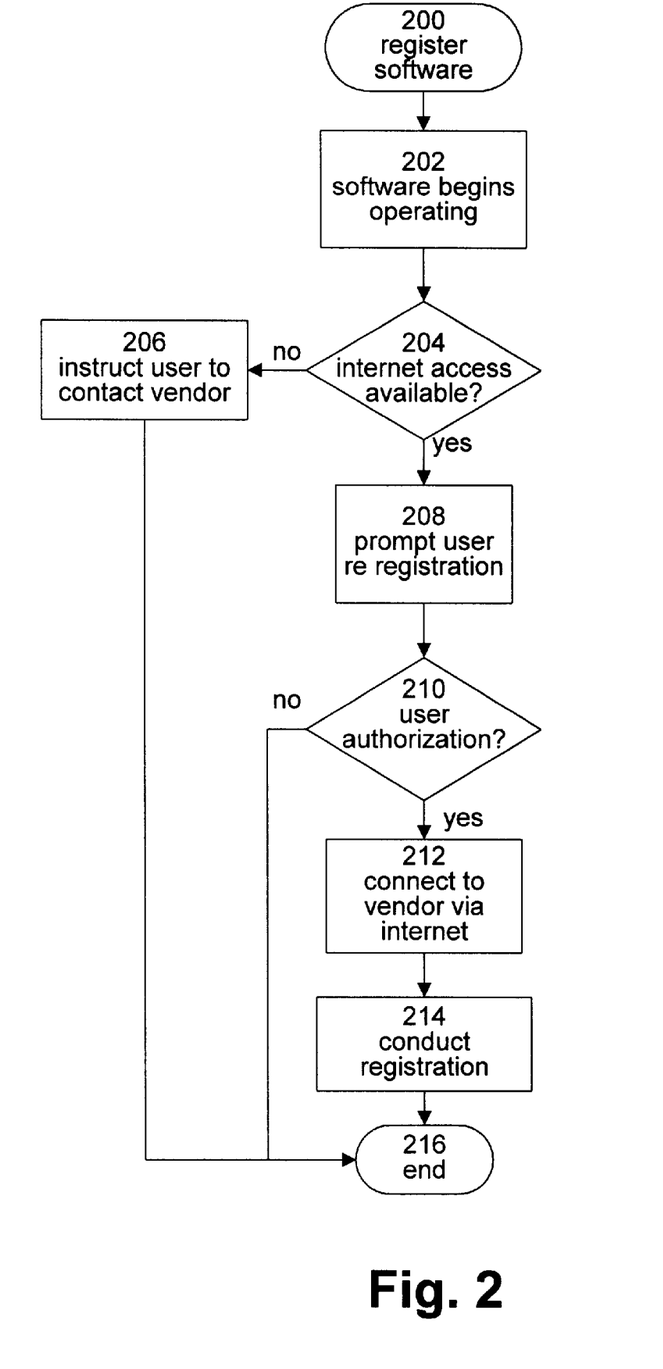
FIG. 2 is a flowchart illustrating remote registration of software according to a specific embodiment of the invention.

According to the invention, a customer may effect registration of software with the vendor via the Internet. A specific embodiment of this aspect of the invention will now be described with reference to flowchart 200 of FIG. 2. When the customer or end user begins operating the software on her platform (step 202), the software determines whether access to the Internet is available (step 204). If not, a dialog box is presented instructing the user to contact the software vendor for registering her copy of the software (step 206). If, on the other hand, Internet access is available, the software presents a dialog box prompting the user to authorize registration of the software (step 208). If the user does not authorize moving forward with the registration process (step 210), the software registration routine ends and the user may proceed with normal operation of the software. However, if the user does give authorization, an Internet connection is established between the user's platform and the vendor (step 212) by which registration of the software is effected (step 214). Once the software is registered, normal operation of the software on the user's platform may proceed.

Several advantages result from software registration achieved in the above-described manner. Because of the automated nature of the registration process described herein, the registration of a software product employing this process is much more likely to occur than if the onus for effecting registration is placed entirely on the customer as in the case, for example, of registration by mail. And, when vendors know who has purchased their software, they are in a better position to provide the technical support necessary to enable their customers to use their products to their greatest advantage. In addition, with accurate customer data, vendors are better able to develop product design strategies which are responsive to the needs of their customer base.

Figure 3:
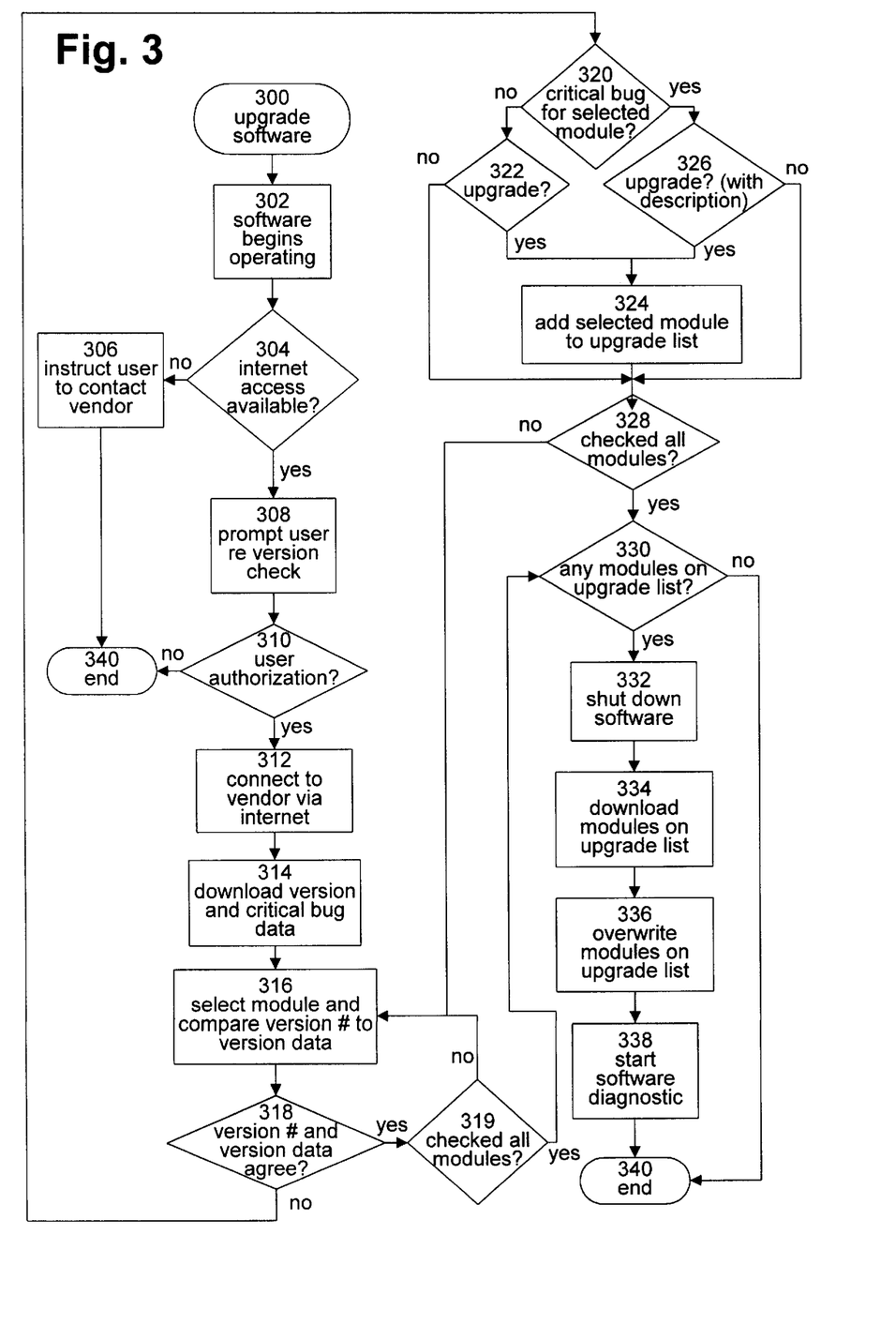
FIG. 3 is a flowchart illustrating remote upgrading of software according to a specific embodiment of the invention.

FIG. 3 is a flowchart 300 illustrating a method by which a customer's software may be upgraded according to a specific embodiment of the invention. When the customer or end user begins operating the software on her platform (step 302), the software determines whether access to the Internet is available (step 304). If not, and the user's software is older than some predetermined aging period, a dialog box is presented instructing the user to contact the software vendor for determining whether she has the latest version of the software (step 306). If, for example, the software is updated quarterly, the dialog box is presented if the version of the software on the user's platform is more than three months old.

If, on the other hand, Internet access is available, the software presents a dialog box prompting the user to authorize connecting to the vendor for this determination (step 308). In either case, the user is also given the option of indicating that she does not wish to be asked again regarding updating the software. If the user does not authorize the connection (step 310), the software upgrade routine ends and the user may proceed with normal operation of the software. However, if the user does give authorization, an Internet connection is established between the user's platform and the vendor (step 312) by which the upgrade process may proceed.

Data are downloaded from the vendor to the user's platform regarding the most current version of the software and any critical software bugs known to the vendor (step 314). These data are used to determine whether the user's software is appropriately updated and whether any of the modules of the software are affected by the known bugs. Each individual module of the user's software is selected and compared to the version and critical bug data (step 316). Where the version number of the selected module and the version data agree (step 318) and where modules remain which have not been checked (step 319), another module is selected for comparison. If at step 318 the selected module is determined not to be the latest version, it is then determined whether the critical bug data identify the selected module (step 320). If not, a dialog box is generated asking the user whether the module should be upgraded (step 322).

If the user indicates that the module should be upgraded, it is added to an upgrade list (step 324). If at step 320 the selected module is identified as having a critical bug, a dialog box describing the nature of the bug is generated asking the user whether the module should be upgraded (step 326). Again, if the user authorizes the upgrade, the module is added to the upgrade list.

According to a specific embodiment of the invention, the critical bug data downloaded from the vendor's platform may be employed to determine whether a particular user is likely to encounter a known bug. For example, where the software is for designing programmable logic devices, it could be the case that a particular bug only affects operation of the software with respect to a particular family of PLDS. By studying previous use data associated with the software, it may be determined whether the user has ever worked with that device family and, therefore, whether the bug should be fixed. In one embodiment, the software is simply not analyzed with respect to such a bug. In another embodiment, the user is given the option of deciding whether the bug should be fixed.

Once all of the modules have been checked (step 328) it is determined whether any modules have been placed on the upgrade list (step 330). Where no modules have been designated for upgrade, the upgrade software routine ends and the user may proceed with normal operation of the software. If, however, an upgrade has been requested by the user for at least one module, the user's software is shut down (step 332) and new modules are downloaded from the vendor to the user's platform (step 334) and written over the corresponding modules on the upgrade list (step 336). A diagnostic of the newly configured software modules is then performed to ensure proper operation (step 338). Once the diagnostic indicates proper operation, the routine ends and normal operation of the software may proceed.

Due to the nature of the above-described procedure, the difficult task of ensuring that customers are using the most recent version of a vendor's software is greatly facilitated. As will be understood, the upgrading of software, especially complex design tools, is desirable for a number of reasons. For example, it is virtually impossible to discover all of the bugs in a software program before distributing it to customers. In fact, it is the use by a large customer base which produces all of the conditions needed to expose any hidden problems. Therefore, once such problems are exposed, portions of the software affected by the bugs must be upgraded. In addition, as improvements to a software package are developed, it is in a vendor's interest to make sure that its customers can take advantage of the improvements.

However, as discussed above, registration of software by a customer base has historically been inconsistent. This has provided an obstacle to upgrading software packages in that the vendor's information about its customer base has been correlatively inconsistent. Even where registration is accomplished, it is often difficult for a vendor to identify the appropriate individual in a customer's organization to effect the upgrade due to the fact that people frequently change their employment situations.

The manner in which software upgrades have been traditionally effected has also been problematic. In addition to the difficulties associated with identifying customers and contacts, the distribution of the new code on some digital storage medium is both costly and time consuming. Moreover, once the new code is in the hands of the customer, there is no guarantee that it will be installed correctly on the customer's system. In fact, many of the problems that customers encounter in the use of software is a direct result of incorrect installation and/or configuring of the software. These problems are exacerbated by the fact that, especially during the period immediately following release of new software, several upgrades a year may be necessary.

The software upgrade method described herein addresses each of these problems. Because the user is asked each time she boots up when an upgrade is available and/or recommended, it is much more likely that each user will have the latest version of the software, no matter how many upgrades occur. Moreover, the necessity for keeping track of the appropriate contact person at each customer is eliminated in that, because the upgrade is done directly with each user, there is no longer a role for such an individual in the transaction. The cost and delay which characterized previous distribution schemes is also no longer an issue. Shipping, production, and advertising costs are virtually eliminated, and the only delay is due to the customer's refusal to authorize an upgrade. Finally, because installation and configuration of the software is exclusively under the control of the vendor, the incidence of incorrect installations should be dramatically reduced. In addition, if a vendor has accurate records regarding its customer base (as would be the case, for example, where a vendor employs the registration process described above with reference to FIG. 2), it could independently track whether or not specific customers are using the most current version of their product by keeping track of the customers who have requested an upgrade. Simply by being aware of the current version being used by its various customers, a vendor will be able to provide a greater level of customer service.

Figure 4A:
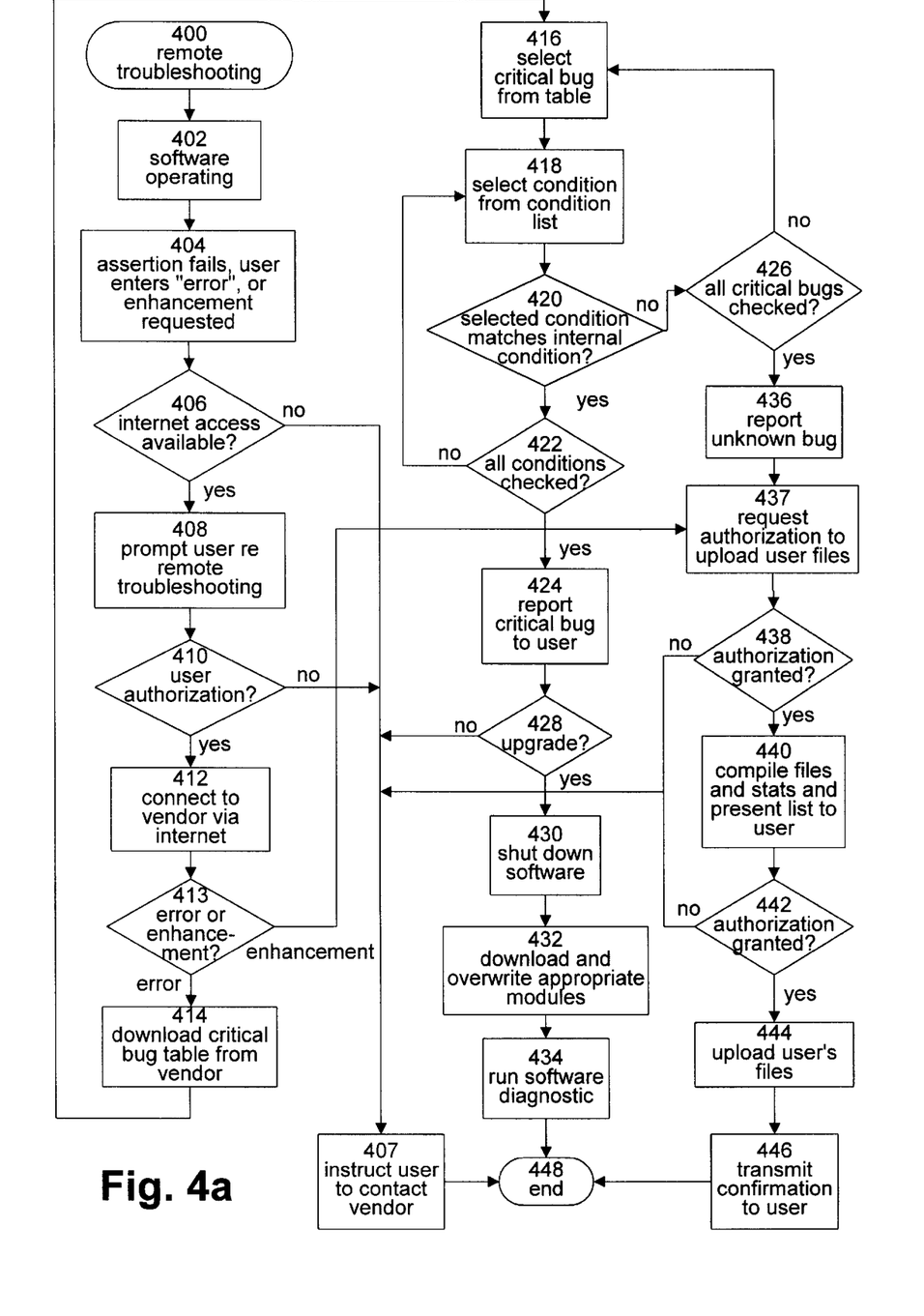
FIGS. 4a and 4b are flowcharts illustrating remote troubleshooting of software according to specific embodiments of the invention.

FIG. 4a is a flowchart 400 illustrating a technique by which a diagnostic routine may be performed on software on a user's platform from a remote platform. When, during operation of software on a user's platform (step 402), either an error occurs, the user indicates that in her opinion an error has occurred, or the user wishes to requests an enhancement to the software (step 404), the software determines whether access to the Internet is available (step 406) for the purpose of connecting to the vendor of the software. If Internet access is not available, a dialog box instructs the user to contact the vendor, providing, for example, the name, phone number, and e-mail address of an appropriate contact person (step 407). If, however, Internet access is available, a dialog box is generated which queries the user as to whether remote troubleshooting should begin (step 408). If the user responds affirmatively (step 410), a connection between the user's platform and the software vendor is established via the Internet (step 412) and, if an error is indicated (step 413), a critical bug table is downloaded from the vendor's platform to the user's (step 414). Otherwise, the routine proceeds directly to step 437. The critical bug table contains a list of known bugs, each of which has an associated condition list which is a list of internal conditions of the software by which the associated critical bug is characterized. These internal conditions represent the state of internal variables in the software after the critical bug has occurred.

A critical bug is selected from the table (step 416) and a condition is selected from the condition list associated with the selected critical bug (step 418). If the selected condition matches an internal condition of the user's software (step 420) and there are conditions in the list which have not been checked (step 422), the next condition in the condition list is selected. If, the routine makes it through all of the conditions in the list, i.e., all of the conditions in the list match the internal conditions of the user's software, the associated critical bug is assumed to be the cause of the software error and is reported as such to the user via a dialog box (step 424). However, as soon as the routine encounters a single condition in the condition list which does not match the internal state of the software, and where all of the critical bugs in the critical bug table have not been checked (step 426), the next bug in the table is selected for comparison of its condition list to the software.

Once a known bug is reported to the user at step 424, the user is asked whether the software should be upgraded to correct the bug (step 428). In response to the user's authorization, the user's software is shut down (step 430) and software modules corresponding to the identified bug are downloaded from the vendor's platform and written over the corresponding modules on the user's platform (step 432). A diagnostic is then run to ensure that the software is correctly configured and operational (step 434). If at step 428 the user does not authorize the upgrade, she is instructed to contact the vendor as described above (step 407).

Where at step 426 all critical bugs have been checked and no matches found, a dialog box is generated by which the user is informed that the error is likely due to an unknown bug (step 436). Authorization is then requested to upload any necessary files from the user's platform for troubleshooting of the problem on the vendor's platform (step 437). If the user grants authorization to upload the requested files (step 438), a list of files and other necessary information regarding the user's system and the state of the software is compiled and presented to the user to obtain a second, informed authorization for the upload (step 440). Where the user has reviewed the list and given authorization, the information is uploaded to the vendor's platform (step 444), confirmation of which is transmitted back to the user (step 446). With the user's files and the other information from the user's systems, the vendor may then recreate the conditions under which the failure occurred, thereby reproducing and, hopefully, correcting the problem. If authorization for the upload of information is not granted in either of steps 438 or 442, the user is instructed to contact the vendor as described above (step 407).

Figure 4B:
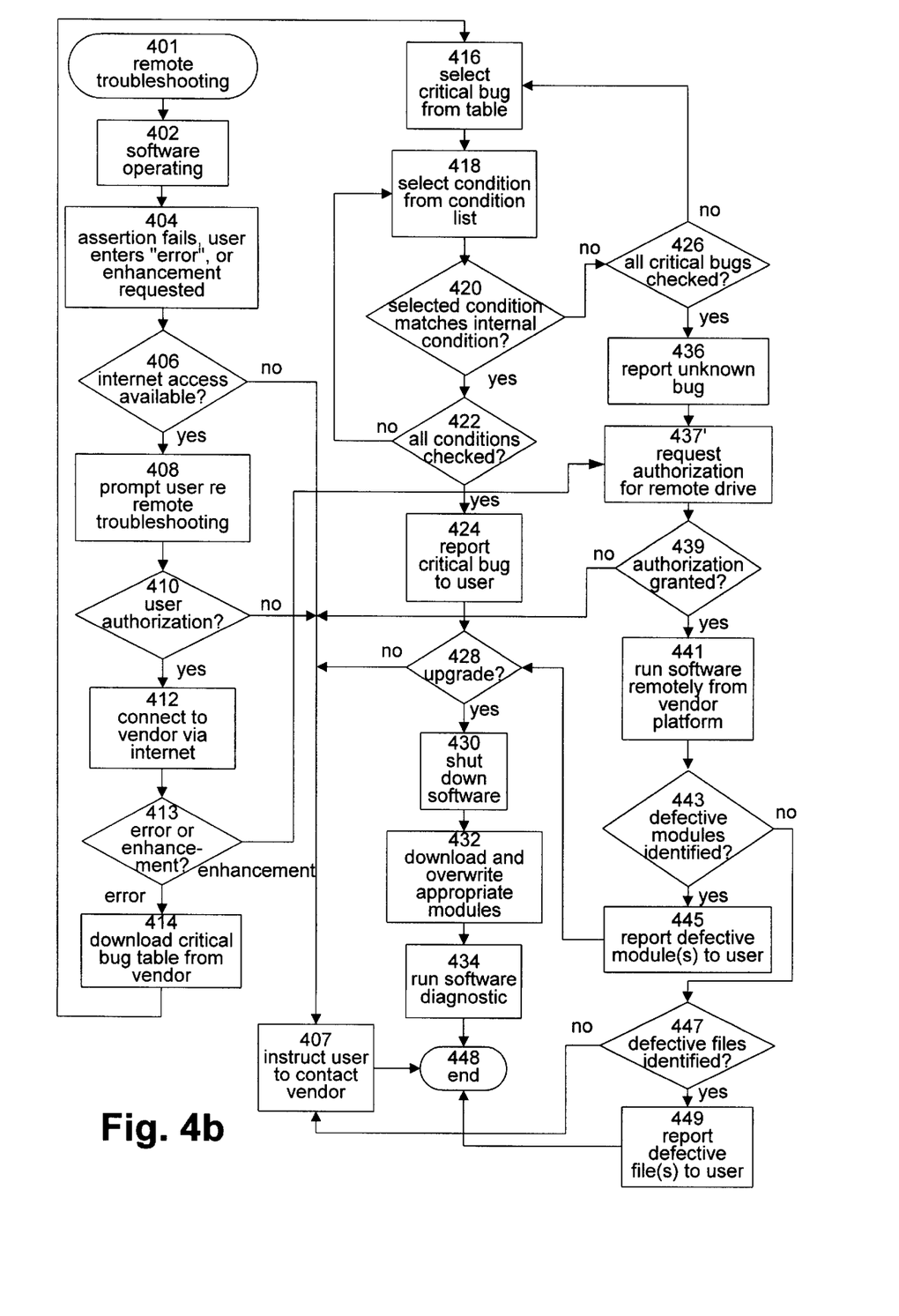

FIG. 4b is a flowchart 401 illustrating another technique by which a diagnostic routine may be performed remotely on software on a user's platform. Steps 402 through 436 are the same as described above with reference to FIG. 4a. However, if all critical bugs in the critical bug table have been checked, i.e., no matches have been found (step 426), a dialog box is generated by which the user is informed that the error is likely due to an unknown bug (step 436). Authorization is then requested to remotely run the software from the vendor's platform using files on the user's platform (step 437'). If authorization is granted (step 439), the software is run from the vendor's platform (step 441). If not, the user is instructed to contact the vendor (step 407).

The remote drive of this specific embodiment of the invention steps sequentially through the software commands of the user's software until an error condition is reached. That is, this technique attempts to recreate the error condition originally encountered by the user without having to upload all of the user's files which, for a programmable logic design, for example, can be rather large. If, through this remote drive technique, a particular module of the user's software is identified as causing the problem (step 443), the defective module is reported to the user (step 445) and the module may be upgraded as described above with reference to steps 428–434 of FIG. 4a. If, one of the user's files is identified as causing the problem (step 447), the defective file is reported to the user along with vendor contact information for additional support in solving the identified problem (step 449). If the remote drive can neither identify defective software modules nor defective user files, the user is instructed to contact the vendor as described above (step 407).

The advantages of the above-described embodiments of the invention are manifest. Prominent among these is the fact that the time between the occurrence of an error in the operation of a software program and the diagnosis and correction of the error by the vendor is dramatically reduced. The user does not have to contact the vendor. Except for a few dialog boxes, the process is virtually automatic. Even in the case where the user's problem is the result of some unknown bug, the present invention provides alternative levels of troubleshooting designed to solve the problem as quickly and efficiently as possible. In each case, the vendor gets an accurate "snapshot" of the user's system and data files so that the error is correctly reproduced, thereby ensuring that the appropriate troubleshooting approach is taken.

The importance of solving customer problems so quickly cannot be overstated. The programmable logic design market is exemplary in this regard. Any periods of time in the design of a programmable logic device during which the design process is not moving forward is extremely costly. One of the main focuses for many vendors in this area of technology is reducing the amount of time required to get a chip to market. The efficiency with which the present invention facilitates and supports the design process is a significant advancement toward this goal.

Figure 5:
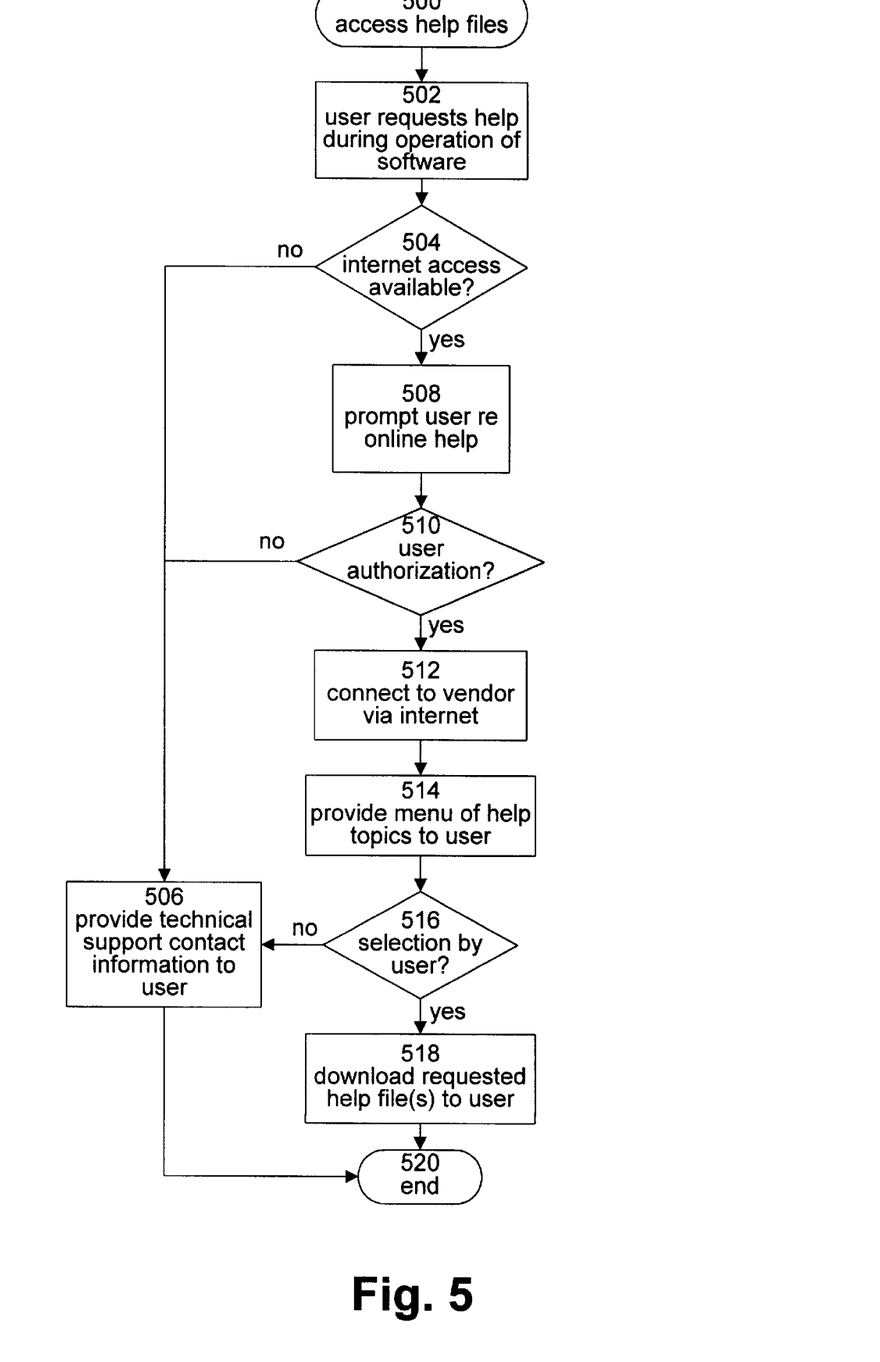
FIG. 5 is a flowchart illustrating access of help files according to a specific embodiment of the invention.

FIG. 5 is a flowchart 500 which illustrates the manner in which a user of software may access help files which are resident on a remote platform maintained by the vendor of the software. When, during operation of the software, the user requests help (step 502), the software on the user's platform determines whether access to the Internet is available (step 504). If Internet access is not available, the user's software generates a dialog box which provides information to the user regarding how to obtain technical support from the vendor (step 506). If, however, Internet access is available, a dialog box is generated which informs the user about online help available from the vendor (step 508). If the user decides to use the online help (step 510), a connection between the user's platform and the vendor is established via the Internet (step 512). Otherwise, the user is provided with the technical support information at step 506. A menu of help topics is then downloaded from the vendor's platform and provided to the user (step 514). In response to the selection of a topic or topics by the user (step 516), help files associated with the selected topic(s) are downloaded to the user's platform (step 518). If the user does not make a selection, i.e., cancels the request, the support information described above with reference to step 506 is provided.

The online technical support described above is another way in which the present invention facilitates optimal use of a software program. Because the help files are located on the vendor's platform, they can be updated as necessary to reflect the current state of the software and to incorporate any additional information which may become apparent to the vendor over time. According to the invention, one way in which such information may be collected is through monitoring by the vendor of the help requests from its customer base. By compiling statistics regarding the use of its help utility, the vendor can determine which help files are most frequently requested. This information, in turn, may be useful in guiding the vendor's efforts to improve its product as well as in focusing technical support resources.

The various aspects of the present invention all envision a greater connectivity between a software vendor and its customers to provide a more responsive level of service and technical support. There are a number of other advantages which may also be realized as a result of this paradigm. For example, software vendors may take advantage of the frequent connections to customer platforms to provide information to their customer base regarding new and related products for which the customer might have an interest. More specifically based on information gathered about specific customers over a period of time, a vendor may be able to provide such information in a format and with content specifically tailored to the needs of each customer. Thus, the present invention is also useful for facilitating an adaptive and forward-looking customer-vendor relationship.

Figure 6:
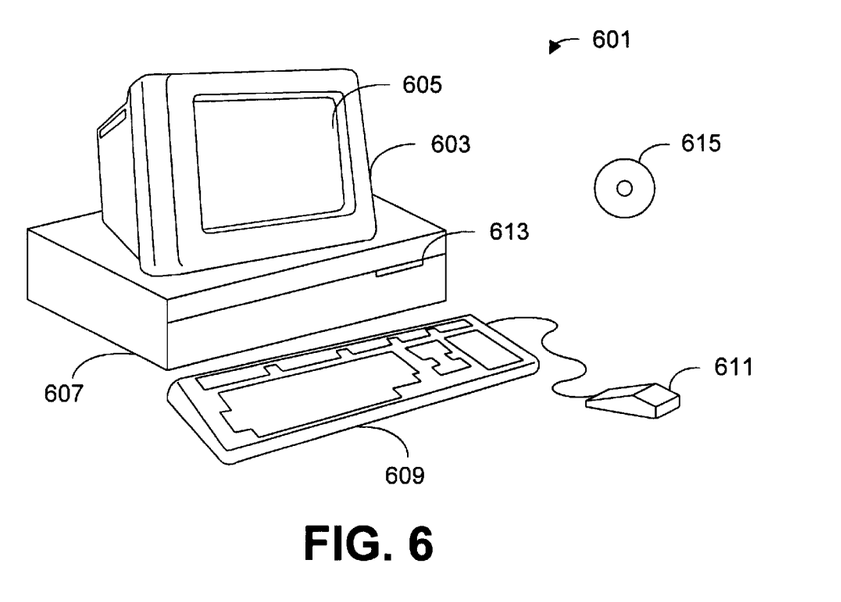
FIG. 6 illustrates an example of a computer system that may be used to execute the software of an embodiment of the invention.

FIG. 6 illustrates an example of a computer system that may be used to execute the software of an embodiment of the invention. That is, system 601 is exemplary of, for example, workstation 100 and/or server 110 of FIG. 1. Computer system 601 includes a display 603, screen 605, cabinet 607, keyboard 609, and mouse 611. Mouse 611 may have one or more buttons for interacting with a graphical user interface. Cabinet 607 houses a CD-ROM drive 613, system memory and a hard drive (see FIG. 7) which may be utilized to store and retrieve software programs incorporating computer code that implements the invention, data for use with the invention, and the like. Although the CD-ROM 615 is shown as an exemplary computer readable storage medium, other computer readable storage media including floppy disks, tape, flash memory, system memory, and hard drives may be utilized.

Figure 7:
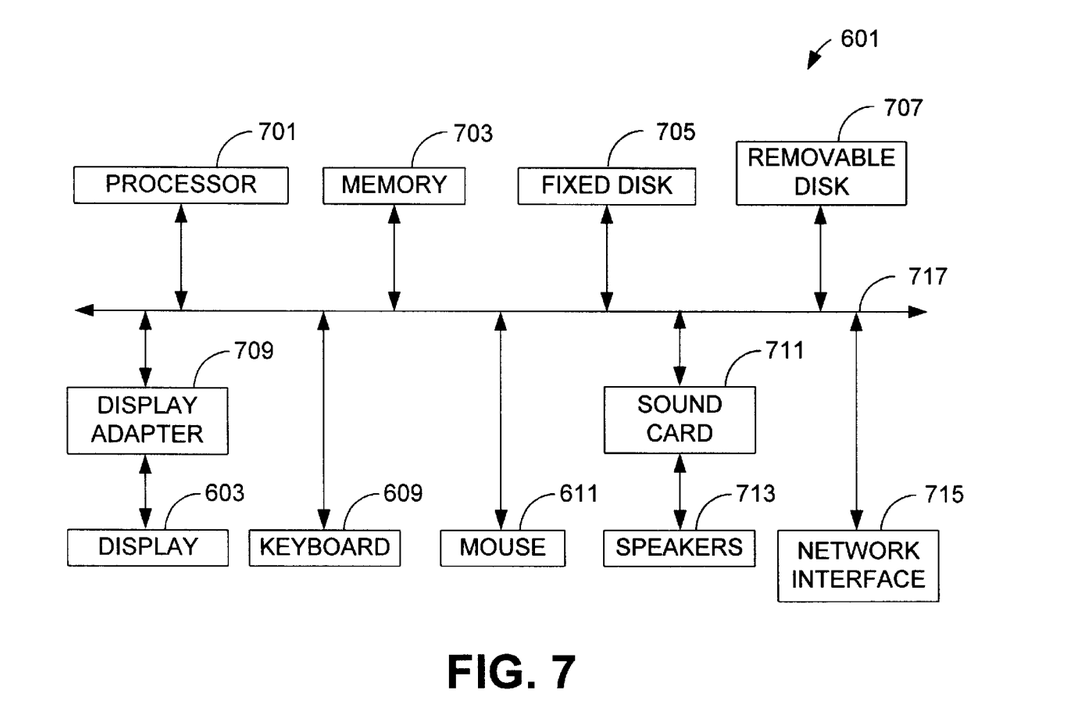
FIG. 7 shows a system block diagram the computer system of FIG. 6.

FIG. 7 shows a system block diagram of computer system 601 used to execute the software of an embodiment of the invention. As in FIG. 6, computer system 601 includes monitor 603 and keyboard 609, and mouse 611. Computer system 601 further includes subsystems such as a central processor 701, system memory 703, fixed disk 705 (e.g., hard drive), removable disk 707 (e.g., CD-ROM drive), display adapter 709, sound card 711, speakers 713, and network interface 715. Other computer systems suitable for use with the invention may include additional or fewer subsystems. For example, another computer system could include more than one processor 701 (i.e., a multi-processor system), or a cache memory.

The system bus architecture of computer system 601 is represented by arrows 717. However, these arrows are illustrative of any interconnection scheme serving to link the subsystems. For example, a local bus could be utilized to connect the central processor to the system memory and display adapter. Computer system 601 shown in FIG. 7 is but an example of a computer system suitable for use with the invention. Other computer architectures having different configurations of subsystems may also be utilized.

While the invention has been particularly shown and described with reference to specific embodiments thereof, it will be understood by those skilled in the art that changes in the form and details of the disclosed embodiments may be made without departing from the spirit or scope of the invention. For example, several of the examples in this specification were related with reference to software for designing programmable logic devices. However, it is clear that the principles described herein may be applied to a wide variety of software programs. Therefore, the scope of the invention should be determined with reference to the appended claims.

What is claimed is:

1. A method for upgrading first software comprising:
   in response to operation of the first software on a first platform, establishing a connection between the first platform and a remote platform;
   where first version data associated with the first software are different from second version data from the remote platform, overwriting a first portion of the first software with first updated code from the remote platform; and
   where known error data from the remote platform correspond to the first software, overwriting a second portion of the first software with second updated code.

2. The method of claim 1 wherein the first software comprises a plurality of software modules, and wherein the overwriting occurs for each of the plurality of software modules for which the first and second version data are different.

3. The method of claim 1 further comprising downloading the known error data from the remote platform to the first platform.

4. The method of claim 1 wherein establishing the connection comprises establishing an Internet connection.

5. The method of claim 4 further comprising determining whether access to the Internet is available.

6. The method of claim 1 further comprising obtaining authorization from a user of the first software to establish the connection.

7. The method of claim 6 further comprising, where authorization is not obtained, providing software support information to the user of the first software.

8. The method of claim 1 further comprising shutting down operation of the first software before overwriting the first portion of the first software.

9. The method of claim 1 further comprising, after overwriting the first portion of the first software, running a software diagnostic routine on the first software.

10. The method of claim 1 further comprising downloading the first version data from the remote platform to the first platform.

11. At least one computer readable medium containing program instructions for upgrading first software, said at least one computer readable medium comprising:
    computer readable code for, in response to operation of the first software on a first platform, establishing a connection between the first platform and a remote platform;
    computer readable code for, where first version data associated with the first software are different from second version data from the remote platform, overwriting a first portion of the first software with first updated code from the remote platform; and
    computer readable code for, where known error data from the remote platform correspond to the first software, overwriting a second portion of the first software with second updated code.

12. A computer data signal embodied in a carrier wave and representing sequences of instructions which, when executed by at least one processor, cause said at least one processor to upgrade first software by:
    in response to operation of the first software on a first platform, establishing a connection between the first platform and a remote platform;
    where first version data associated with the first software are different from second version data from the remote platform, overwriting a first portion of the first software with first updated code from the remote platform; and
    where known error data from the remote platform correspond to the first software, overwriting a second portion of the first software with second updated code.

13. A computer readable medium containing program instructions corresponding to first software, the first software having been upgraded according to a method comprising:

in response to operation of the first software on a first platform, establishing a connection between the first platform and a remote platform;

where first version data associated with the first software are different from second version data from the remote platform, overwriting a first portion of the first software with first updated code from the remote platform; and where known error data from the remote platform correspond to the first software, overwriting a second portion of the first software with second updated code.

14. A method for troubleshooting first software comprising:

in response to an error in operation of the first software on a first platform, establishing a connection between the first platform and a remote platform;

where the error corresponds to known error data from the remote platform, overwriting a portion of the first software with updated code;

where the error does not correspond to the known error data, uploading data files associated with the first software from the first platform to the remote platform via the connection; and reproducing the error on the remote platform using the data files.

15. The method of claim 14 further comprising downloading the known error data from the remote platform to the first platform.

16. The method of claim 14 wherein establishing the connection comprises establishing an Internet connection.

17. The method of claim 16 further comprising determining whether access to the Internet is available.

18. The method of claim 14 further comprising obtaining authorization from a user of the first software to establish the connection.

19. The method of claim 18 further comprising, where authorization is not obtained, providing software support information to the user of the first software.

20. The method of claim 14 further comprising shutting down operation of the first software before overwriting the first portion of the first software.

21. The method of claim 14 further comprising, after overwriting the first portion of the first software, running a software diagnostic routine on the first software.

22. The method of claim 14 further comprising obtaining authorization from a user of the first software for uploading the data files.

23. The method of claim 22 further comprising, where authorization is not obtained, providing software support information to the user of the first software.

24. The method of claim 14 further comprising, before uploading the data files, compiling information from the first platform regarding the data files.

25. A method for troubleshooting first software comprising:

in response to an error in operation of the first software on a first platform, establishing a connection between the first platform and a remote platform;

where the error corresponds to known error data from the remote platform, overwriting a portion of the first software with updated code; and where the error does not correspond to the known error data, operating the first software on the first platform from the remote platform via the connection, thereby reproducing the error on the first platform.

26. The method of claim 25 further comprising obtaining authorization from a user of the first software for operating the first software from the remote platform.

27. The method of claim 26 further comprising, where authorization is not obtained, providing software support information to the user of the first software.

28. At least one computer readable medium containing program instructions for troubleshooting first software, said at least one computer readable medium comprising:

computer readable code for, in response to an error in operation of the first software on a first platform, establishing a connection between the first platform and a remote platform;

computer readable code for, where the error corresponds to known error data from the remote platform, overwriting a portion of the first software with updated code; and computer readable code for, where the error does not correspond to the known error data, operating the first software on the first platform from the remote platform via the connection, thereby reproducing the error on the first platform.

29. A computer data signal embodied in a carrier wave and representing sequences of instructions which, when executed by at least one processor, cause said at least one processor to troubleshoot first software by:

in response to an error in operation of the first software on a first platform, establishing a connection between the first platform and a remote platform;

where the error corresponds to known error data from the remote platform, overwriting a portion of the first software with updated code; and where the error does not correspond to the known error data, operating the first software on the first platform from the remote platform via the connection, thereby reproducing the error on the first platform.

30. A computer readable medium containing program instructions corresponding to first software, the first software having been troubleshot according to a method comprising:

in response to an error in operation of the first software on a first platform, establishing a connection between the first platform and a remote platform;

where the error corresponds to known error data from the remote platform, overwriting a portion of the first software with updated code; and where the error does not correspond to the known error data operating the first software on the first platform from the remote platform via the connection, thereby reproducing the error on the first platform.

31. A method for upgrading first software comprising:

providing the first software including a first software module which, in response to operation of the first software on a first platform, is operable to establish a connection between the first platform and a remote platform, the first software having first version data associated therewith;

where the first version data differ from second version data from the remote platform, transmitting first updated code from the remote platform to the first platform via the connection for overwriting a first portion of the first software; and transmitting the second version data from the remote platform to the first platform for comparison with the first version.

32. The method of claim 31 wherein the first software comprises a plurality of software modules, and wherein updated code is transmitted for each of the plurality of software modules for which the first and second version data are different.

33. The method of claim 31 further comprising, where known error data from the remote platform correspond to the first software, transmitting second updated code for overwriting a second portion of the first software.

34. The method of claim 33 further comprising transmitting the known error data from the remote platform to the first platform.

35. The method of claim 31 wherein the connection comprises an Internet connection.

36. The method of claim 35 wherein the first software module is operable to determine whether access to the Internet from the first platform is available.

37. The method of claim 31 wherein the first software module is operable to solicit authorization from a user of the first software to establish the connection.

38. The method of claim 31 wherein the first software module is operable to shut down operation of the first software before the first portion of the first software is overwritten.

39. The method of claim 31 further comprising, after the first portion of the first software is overwritten, running a software diagnostic routine on the first software.

40. A method for upgrading first software comprising:
providing the first software including a first software module which, in response to operation of the first software on a first platform, is operable to establish a connection between the first platform and a remote platform, the first software having first version data associated therewith:
where the first version data differ from second version data from the remote platform, transmitting first updated code from the remote platform to the first platform via the connection for overwriting a first portion of the first software wherein the first software module is operable to solicit authorization from a user of the first software to establish the connection, and
where the authorization is not obtained, to provide software support information to the user of the first software.

41. A method for troubleshooting first software comprising:
providing the first software including a first software module which, in response to an error in operation of the first software on a first platform, is operable to establish a connection between the first platform and a remote platform;
where the error corresponds to known error data from the remote platform, transmitting updated code from the remote platform to the first platform via the connection for overwriting a portion of the first software;
where the error does not correspond to the known error data, uploading data files associated with the first software from the first platform to the remote platform via the connection; and
attempting to reproduce the error on the remote platform using the data files.

42. The method of claim 41 further comprising transmitting the known error data from the remote platform to the first platform.

43. The method of claim 41 wherein the connection comprises an Internet connection.

44. The method of claim 43 wherein the first software module is operable to determine whether access to the Internet from the first platform is available.

45. The method of claim 41 wherein the first software module is operable to solicit authorization from a user of the first software to establish the connection.

46. The method of claim 41 wherein the first software module is operable to shut down operation of the first software before the first portion of the first software is overwritten.

47. The method of claim 41 further comprising, after the first portion of the first software is overwritten, running a software diagnostic routine on the first software.

48. The method of claim 41 wherein the first software module is operable to solicit authorization from a user of the first software for uploading the data files.

49. The method of claim 41 further comprising, before uploading the data files, compiling information from the first platform regarding the data files.

50. The method of claim 41 further comprising, where the error does not correspond to the known error data, operating the first software on the first platform from the remote platform via the connection, thereby attempting to reproduce the error on the first platform.

51. The method of claim 41 wherein the first software module is operable to solicit authorization from a user of the first software for operating the first software from the remote platform.

52. The method of claim 51 wherein the first software module is operable, where the authorization is not obtained, to provide software support information to the user of the first software.

53. A method for troubleshooting first software comprising:
providing the first software including a first software module which, in response to an error in operation of the first software on a first platform, is operable to establish a connection between the first platform and a remote platform;
where the error corresponds to known error data from the remote platform, transmitting updated code from the remote platform to the first platform via the connection for overwriting a portion of the first software wherein the first software module is operable to solicit authorization from a user of the first software to establish the connection; and
where the authorization is not obtained, to provide software support information to the user of the first software.

54. A method for troubleshooting first software comprising:
providing the first software including a first software module which, in response to an error in operation of the first software on a first platform is operable to establish a connection between the first platform and a remote platform;
where the error corresponds to known error data from the remote platform, transmitting updated code from the remote platform to the first platform via the connection for overwriting a portion of the first software wherein the first software module is operable to solicit authorization from a user of the first software for uploading the data files; and
where the authorization is not obtained, to provide software support information to the user of the first software.

55. A computer system comprising:
a central processing unit;
a display;
a keyboard; and
memory having software stored therein including a software module which, in response to operation of the software on the computer system, is operable to establish a connection between the computer system and a remote platform, the software having first version data associated therewith, the software module also being operable, where the first version data differ from second version data from the remote platform, to overwrite a portion of the software with updated code and where known error data from the remote platform correspond to the first software, overwriting a second portion of the first software with second updated code.

56. A computer system comprising:

a central processing unit;

a display;

a keyboard; and memory having software stored therein including a software module which, in response to an error in operation of the software on the computer system, is operable to establish a connection between the computer system and a remote platform, the software module also being operable, where the error corresponds to known error data from the remote platform, to overwrite a portion of the software with updated code and where the error does not correspond to the known error data, operating the first software on the first platform from the remote platform via the connection, thereby reproducing the error on the first platform.

* * * * *